US010166728B2

(12) United States Patent
Shimoda

(10) Patent No.: US 10,166,728 B2
(45) Date of Patent: Jan. 1, 2019

(54) METHOD FOR MANUFACTURING SPOKE UNIT

(71) Applicant: HONDA MOTOR CO., LTD., Tokyo (JP)

(72) Inventor: Shinsuke Shimoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 417 days.

(21) Appl. No.: 15/040,210

(22) Filed: Feb. 10, 2016

(65) Prior Publication Data

US 2016/0236423 A1 Aug. 18, 2016

(30) Foreign Application Priority Data

Feb. 16, 2015 (JP) ................................. 2015-027760

(51) Int. Cl.
| | | |
|---|---|---|
| *B29C 53/70* | (2006.01) | |
| *B29C 53/76* | (2006.01) | |
| *B29C 53/82* | (2006.01) | |
| *B60B 5/02* | (2006.01) | |
| *B29C 70/32* | (2006.01) | |
| *B29C 53/56* | (2006.01) | |
| *B29K 105/08* | (2006.01) | |

(Continued)

(52) U.S. Cl.
CPC ............ *B29C 70/32* (2013.01); *B29C 53/564* (2013.01); *B29C 53/70* (2013.01); *B29C 53/76* (2013.01); *B29C 53/821* (2013.01); *B29C 53/828* (2013.01); *B60B 5/02* (2013.01); *B29K 2105/08* (2013.01); *B29K 2307/04* (2013.01); *B29L 2031/32* (2013.01); *B60B 2310/204* (2013.01); *B60B 2310/80* (2013.01)

(58) Field of Classification Search
CPC ....... B29C 53/564; B29C 53/68; B29C 53/70; B29C 53/76; B29C 53/8008; B29C 53/82; B29C 53/821; B29C 53/828; B29C 70/24; B29C 70/32; B29K 2105/08; B29K 2105/10; B29K 2105/101; B29K 2105/105; B29K 2307/04; B29L 2031/32; B60B 5/02; B60B 2310/204; B60B 2310/80

See application file for complete search history.

(56) References Cited

U.S. PATENT DOCUMENTS 3,917,352 A * 11/1975 Gageby ................... B29C 70/24
301/64.702
5,578,154 A * 11/1996 Britten .................. B29C 53/564
156/154

FOREIGN PATENT DOCUMENTS

| JP | 61-72541 A | * | 4/1986 |
| JP | 61-242833 A | * | 10/1986 |
| JP | 61-242834 A | * | 10/1986 |

* cited by examiner

*Primary Examiner* — Michael A Tolin
(74) *Attorney, Agent, or Firm* — Westerman, Hattori, Daniels & Adrian, LLP

(57) ABSTRACT

In a method for manufacturing a spoke unit, the continuous fiber reinforced plastic is led from a middle supporting portion to a first supporting portion along the front surface of the mandrel. Subsequently, the continuous fiber reinforced plastic is led from the first supporting portion to the middle supporting portion along the back surface of the mandrel. Subsequently, the continuous fiber reinforced plastic is led from the middle supporting portion to a second supporting portion along the front surface of the mandrel. Subsequently, the continuous fiber reinforced plastic is led from the second supporting portion to the middle supporting portion along the back surface of the mandrel.

10 Claims, 11 Drawing Sheets

(51) Int. Cl.
*B29K 307/04* (2006.01)
*B29L 31/32* (2006.01)

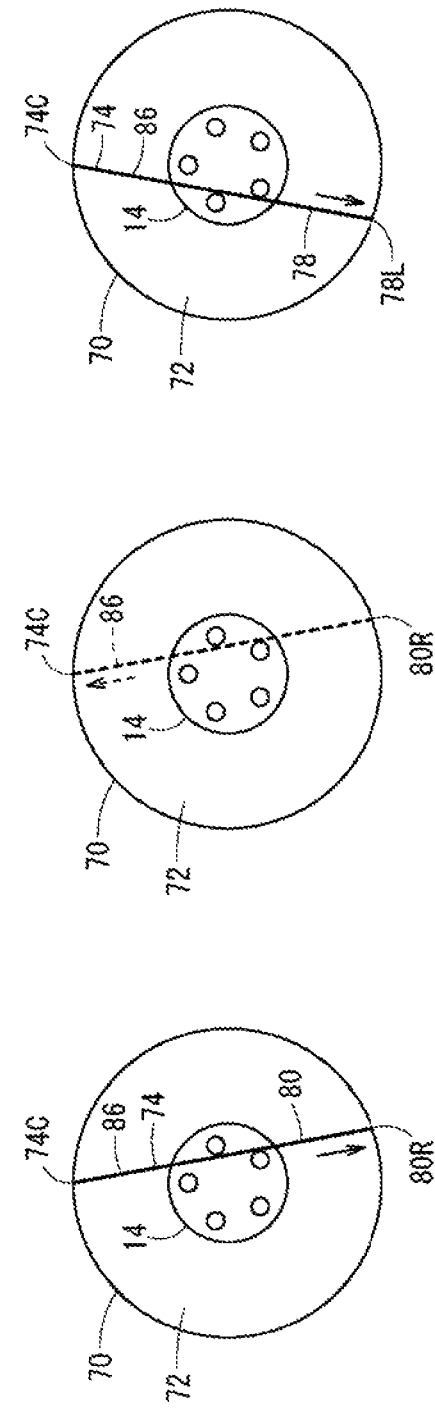

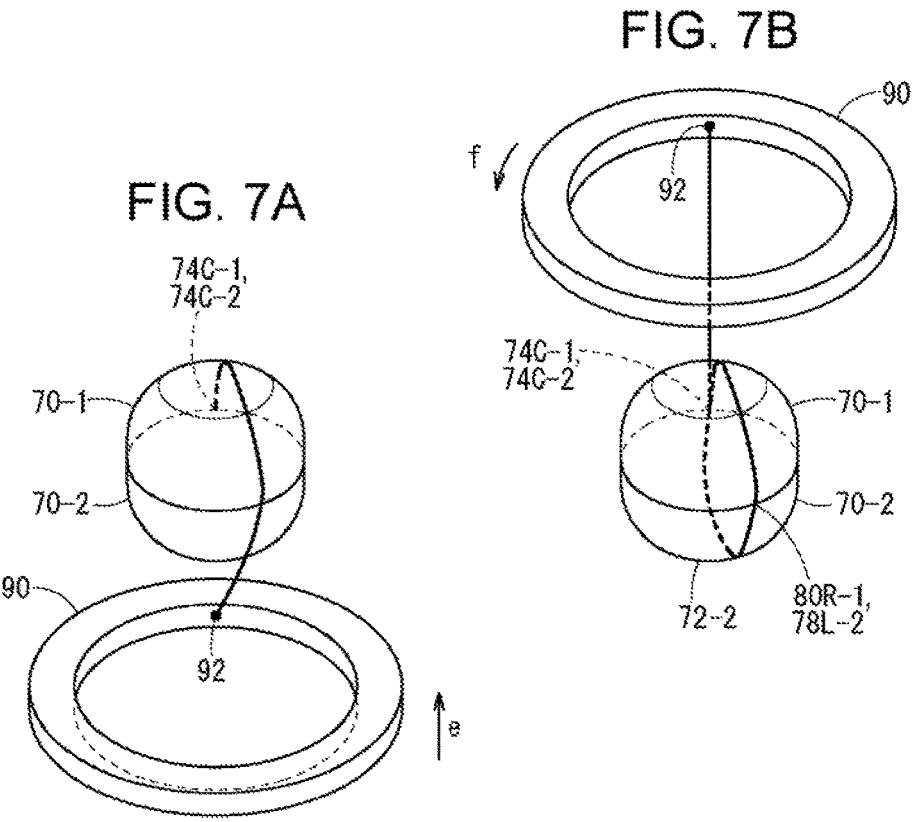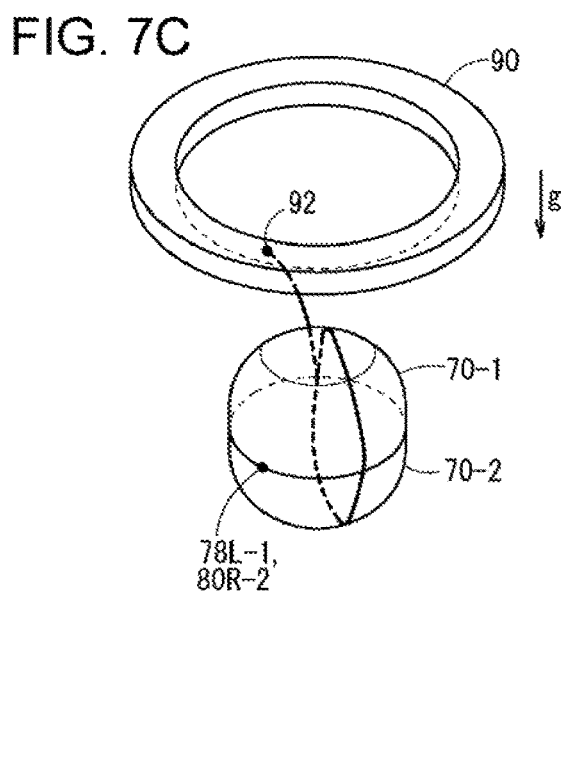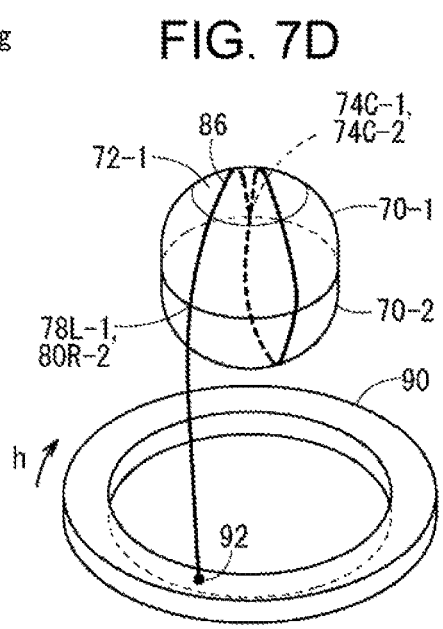

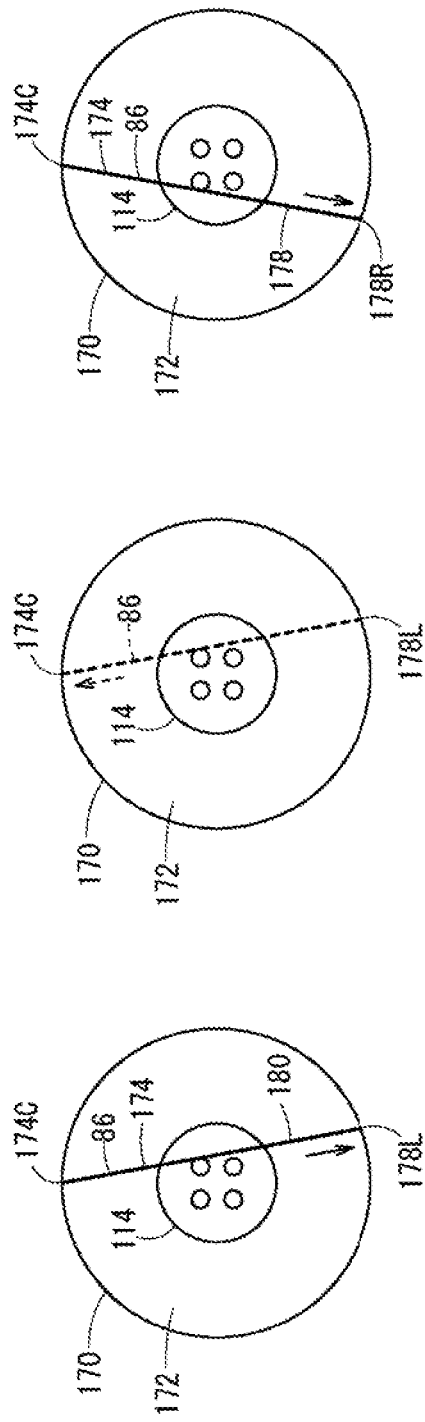

METHOD FOR MANUFACTURING SPOKE UNIT

CROSS REFERENCES TO RELATED APPLICATIONS

The present application claims priority under 35 U.S.C. § 119 to Japanese Patent Application No. 2015-027760, filed Feb. 16, 2015, entitled "Method for Manufacturing Spoke Unit." The contents of this application are incorporated herein by reference in their entirety.

TECHNICAL FIELD

The present disclosure relates to a method for manufacturing a spoke unit using a continuous fiber reinforced plastic as a material.

BACKGROUND

To improve the gas mileage of automobiles and the driving characteristics of the automobiles, technologies for providing lightweight wheels have been developed. One of the technologies is to produce wheels using fiber reinforced plastic (hereinafter simply referred to as "FRP") and, in particular, carbon fiber reinforced plastic (hereinafter simply referred to as "CFRP") as a material.

For example, Japanese Unexamined Patent Application Publication No. 61-72541 describes a method for manufacturing a disk portion of a wheel by winding a filament-shaped resin-impregnated reinforced fiber around a mandrel (so-called a filament, winding molding method). A device used in the method described in Japanese Unexamined Patent Application Publication No. 61-72541 includes a disk-shaped mandrel, a rotary shaft extending from the central point of the front surface of the mandrel and extending from the central point of the back surface of the mandrel in the perpendicular direction, and a drive unit that rotates the rotary shaft. When a disk portion is produced, the rotary shaft and the mandrel are rotated by the drive unit and, at the same time, a filament is wound around the mandrel while reciprocating from the rotary shaft extending from the front surface and serving as one turning point to the rotary shaft extending from the back surface serving as the other turning point. By stretching a single filament between the front surface and the back surface of the mandrel a plurality of times, a disk portion is finally formed on each of the front surface and the back surface of the mandrel. Thereafter, by bonding the disk portion to an aluminum alloy rim, a wheel is achieved.

Note that by providing a plurality of filaments and stretching each of the filaments between particular locations of the front surface and the back surface of a mandrel using the method described in Japanese Unexamined Patent Application Publication No. 61-72541, a spoke unit of the wheel can be manufactured.

SUMMARY

According to the method described in Japanese Unexamined Patent Application Publication No. 61-72541, the filament is intensely stacked around the central axis on the front surface of the mandrel and the center axis on the back surface of the mandrel. Accordingly, the weight of part of the disk portion around the center axis (hereinafter referred to as a "center area") increases. In addition, since the stack height of the central area of the disk portion is greater than the stack height of the other area, the filament stacked around the central axis easily collapses. Thus, the shape may deform. Such a problem may similarly arise when a spoke unit is manufactured using the method described in Japanese Unexamined Patent Application Publication No. 61-72541.

Accordingly, one embodiment of the present application describes a method for manufacturing a spoke unit formed from a continuous fiber reinforced plastic actively oriented in the lengthwise direction of the spoke and capable of reducing a stack of the continuous fiber reinforced plastic in the central area.

According to an aspect of the present disclosure, a method for manufacturing a spoke unit having at least three spokes includes providing a mandrel for molding a spoke unit having supporting portions equal in number to the number of the spokes and winding a continuous fiber reinforced plastic around the mandrel and molding the spoke unit by curing the continuous fiber reinforced plastic. The winding includes leading the continuous fiber reinforced plastic from the supporting portion corresponding to a first one of the spokes to the supporting portion corresponding to a second one of the spokes that faces the first one of the spokes along a front surface of the mandrel and leading the continuous fiber reinforced plastic from the supporting portion corresponding to the second one of the spokes to the supporting portion corresponding to the first one of the spokes via a back surface of the mandrel.

When the continuous fiber reinforced plastic is wound around a mandrel and a spoke is molded, a winding process is performed for each of pairs of spokes facing each other. In the winding process, a turning point of the continuous fiber reinforced plastic is not provided in the center area of the spoke unit. According to the present disclosure, since the continuous fiber reinforced plastic is oriented in the lengthwise direction of the spoke, stack of the continuous fiber reinforced plastic caused by the turn is not generated in the center area of the spoke unit. Accordingly, the weight of the center area can be reduced. In addition, when a plurality of continuous fiber reinforced plastics are wound around a mandrel, the intersecting points are shifted from one another so that three or more continuous fiber reinforced plastics do not intersect at the same position. Accordingly, the difference among the stack heights of the continuous fiber reinforced plastics can be reduced and, thus, the shape of the laminate body when the continuous fiber reinforced plastics are stacked can be maintained unchanged. As a result, the accuracy of stacking can be increased.

The spoke unit may include 2n+1 spokes, where n is a natural number, and each of the spokes may be connected to a rim of a wheel in a middle connecting portion and a first connecting portion and a second connecting portion disposed on either side of the middle connecting portion. The mandrel may have a middle supporting portion corresponding to the middle connecting portion of the spoke, a first supporting portion corresponding to the first connecting portion of the spoke, and a second supporting portion corresponding to the second connecting portion of the spoke for each of the spokes. When in the spoke unit, any one of the spokes is defined as a first spoke, two spokes each facing the first spoke with the center of the spoke unit therebetween are defined as a second spoke and a third spoke, the winding may include a first winding process that leads the continuous fiber reinforced plastic from the middle supporting portion corresponding to the middle connecting portion of the first spoke to the first supporting portion corresponding to the first connecting portion of the third spoke along the front surface of the mandrel, a second winding process that leads the continuous fiber reinforced plastic from the first supporting portion corresponding to the first connecting portion of the third spoke to the middle supporting portion corresponding to the middle connecting portion of the first spoke via the back surface of the mandrel, a third winding process that leads the continuous fiber reinforced plastic from the middle supporting portion corresponding to the middle connecting portion of the first spoke to the second supporting portion corresponding to the second connecting portion of the second spoke along the front surface of the mandrel, and a fourth winding process that leads the continuous fiber reinforced plastic from the second supporting portion corresponding to the second connecting portion of the second spoke to the middle supporting portion corresponding to the middle connecting portion of the first spoke via the back surface of the mandrel.

The spoke unit may include 2n+2 spokes, where n is a natural number, and each of the spokes is connected to a rim of a wheel in the middle connecting portion and the first connecting portion and the second connecting portion disposed on either end of the middle connecting portion. The mandrel may have a middle supporting portion corresponding to the middle connecting portion of the spoke, a first supporting portion corresponding to the first connecting portion of the spoke, and a second supporting portion corresponding to the second connecting portion of the spoke for each of the spokes. When in the spoke unit, any one of the spokes is defined as a first spoke and a spoke facing the first spoke with the center of the spoke unit therebetween is defined as a second spoke, the winding may include a first winding process that leads the continuous fiber reinforced plastic from the middle supporting portion corresponding to the middle connecting portion of the first spoke to the second supporting portion corresponding to the second connecting portion of the second spoke along the front surface of the mandrel, a second winding process that leads the continuous fiber reinforced plastic from the second supporting portion corresponding to the second connecting portion of the second spoke to the middle supporting portion corresponding to the middle supporting portion corresponding to the middle connecting portion of the first spoke via the back surface of the mandrel, a third winding process that leads the continuous fiber reinforced plastic from the middle supporting portion corresponding to the middle connecting portion of the first spoke to the first supporting portion corresponding to the first connecting portion of the second spoke along the front surface of the mandrel, and a fourth winding process that leads the continuous fiber reinforced plastic from the first supporting portion corresponding to the first connecting portion of the second spoke to the middle supporting portion corresponding to the middle connecting portion of the first spoke via the back surface of the mandrel.

Accordingly, to mold the spoke by winding the continuous fiber reinforced plastic around a mandrel, the first to fourth winding processes are performed for each of a pair of spokes facing each other. In the winding process, a turning point of the continuous fiber reinforced plastic is not provided in the center area of the spoke unit. Thus, stack of the continuous fiber reinforced plastic caused by the turn is not generated in the center area of the spoke unit. Accordingly, the weight of the center area can be reduced. In addition, when a plurality of the continuous fiber reinforced plastics are wound around a mandrel, the intersecting points are shifted from one another so that three or more continuous fiber reinforced plastics do not intersect at the same position. Accordingly, the difference among the stack heights of the continuous fiber reinforced plastics can be reduced and, thus, the shape of the laminate body when the continuous fiber reinforced plastics are stacked can be maintained unchanged. As a result, the accuracy of stacking can be increased.

In another embodiment, the first winding process, the second winding process, the third winding process, and the fourth winding process for all the spokes can be simultaneously performed. By simultaneously forming all the spokes, the efficiency of manufacturing the spoke unit can be increased.

In another embodiment, in the winding, the winding can further include combining two mandrels so that front surfaces of the two mandrels are oriented in different directions before the first to fourth winding processes are performed. The continuous fiber reinforced plastic can be led along the front surface of one of the mandrels in the first and third winding processes, and the continuous fiber reinforced plastic can be led along the front surface of the other mandrel in the second and fourth winding processes. By simultaneously molding two spoke units using two mandrels, the manufacturing efficiency of the spoke unit can be increased.

In one embodiment, since a turning point of the continuous fiber reinforced plastic is not in the center area of the spoke unit, a stack of the continuous fiber reinforced plastic caused by the turn is not generated. Accordingly, the weight of the center area of the spoke unit can be made to be smaller than that of the center area of existing spoke units. In addition, when a plurality of the continuous fiber reinforced plastics are wound around the mandrel, the intersecting points of the continuous fiber reinforced plastics are shifted from one another. Thus, three or more continuous fiber reinforced plastics do not intersect at the same position. Consequently, the difference in the stack heights of the continuous fiber reinforced plastics can be reduced, and the shape of the laminate body of the stacked continuous fiber reinforced plastics can be maintained unchanged. As a result, the accuracy of the stacking can be increased.

BRIEF DESCRIPTION OF THE DRAWINGS

The advantages of the disclosure will become apparent in the following description taken in conjunction with the following drawings.

FIGS. 3A to 3E are process transition diagrams illustrating a method for manufacturing a spoke unit according to the first exemplary embodiment.

FIGS. 7A to 7D are process transition diagrams illustrating a method for manufacturing a spoke unit according to the second exemplary embodiment.

FIGS. 11A to 11E are process transition diagrams illustrating a method for manufacturing a spoke unit according to the third exemplary embodiment.

DETAILED DESCRIPTION

Exemplary embodiments of a method for manufacturing a spoke unit according to the present disclosure are described in detail below with reference to the accompanying drawings.

First Exemplary Embodiment

Structure of Wheel

Figure 1:
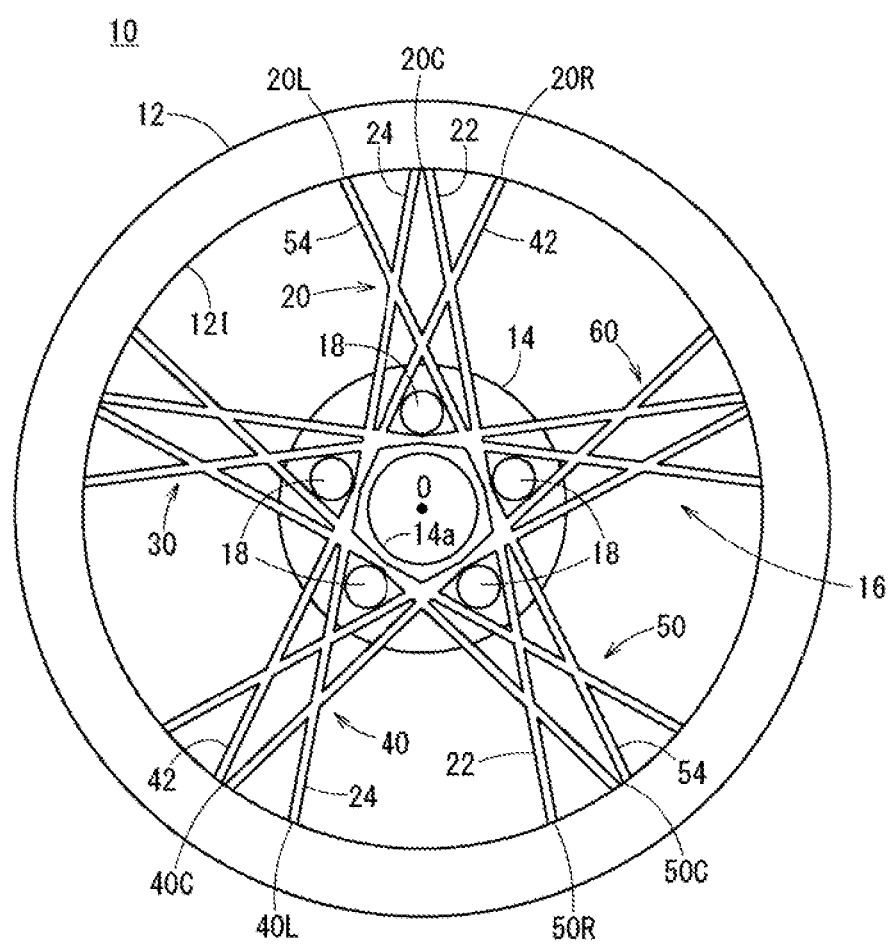
FIG. 1 is a front external view of a wheel according to each of first and second exemplary embodiments.

The structure of a wheel 10 including a spoke unit 16 is described below with reference to a front view of the wheel 10 illustrated in FIG. 1. The wheel 10 includes a cylindrical rim 12, a hub 14 located at the center of the rim 12, and the spoke unit 16 disposed between the rim 12 and the hub 14. The spoke unit 16 includes five (2n+1, n: a natural number) integrally molded spokes 20, 30, 40, 50, and 60.

The rim 12 is formed of, for example, a metal or CFRP. Five metal insert members 18 are disposed so as to surround a bore 14a at equal intervals and are embedded into the hub 14. The insert members 18 are located as extensions of spokes 20, 30, 40, 50, and 60. By employing the metal insert members 18, an axial tension can be ensured when a nut is tightened.

The spoke unit 16 is formed from, for example, CFRP. The five spokes 20, 30, 40, 50, and 60 are disposed around a central point O of the spoke unit 16 at equal intervals. For example, two spokes 40 and 50 face the spoke 20 with the central point O of the spoke unit 16 therebetween. That is, two spokes 40 and 50 are disposed so as to be the furthest from the spoke 20. Similarly, two spokes face each of the spokes 30, 40, 50, and 60.

The structures of the spokes 20, 30, 40, 50, and 60 are described below with reference to the spoke 20. The spoke 20 includes four ribs 22, 24, 42, and 54. Each of the ribs 22, 24, 42, and 54 is formed by stacking filaments each containing a carbon fiber and resin or a bundle of the filaments. According to the present exemplary embodiments, the filament and the bundle of filaments are formed from continuous fiber reinforced plastic 86 (refer to FIGS. 3A to 3E). The continuous fiber reinforced plastic 86 is also referred to as "unidirectional reinforcement 86", "unidirectional composite 86", or a "UD material 86".

The spoke 20 has three end portions each connected to the inner peripheral surface 12I of the rim 12. The three end portions are a middle connecting portion 20C, a first connecting portion 20R, and a second connecting portion 20L. The first connecting portion 20R and the second connecting portion 20L are located on either side of the middle connecting portion 20C. That is, the first connecting portion 20R is disposed on a portion of the inner peripheral surface 12I on one side of the middle connecting portion 20C (in the clockwise direction in FIG. 1), and the second connecting portion 20L is disposed on a portion of the inner peripheral surface 12I on the other side (in the counterclockwise direction in FIG. 1). One end of each of the ribs 22 and 24 is connected to the inner peripheral surface 12I of the rim 12 at the middle connecting portion 20C. One end of the rib 42 is connected to the inner peripheral surface 12I of the rim 12 at the first connecting portion 20R. One end of the rib 54 is connected to the inner peripheral surface 12I of the rim 12 at the second connecting portion 20L.

The rib 22 extends from the spoke 20 to the spoke 50 that faces the spoke 20 while passing over the hub 14. The other end of the rib 22 is connected to the inner peripheral surface 12I of the rim 12 at the first connecting portion 50R of the spoke 50. The rib 24 extends from the spoke 20 to the spoke 40 that faces the spoke 20 while passing over the hub 14. The other end of the rib 24 is connected to the inner peripheral surface 12I of the rim 12 at a second connecting portion 40L of the spoke 40.

The rib 42 extends from the spoke 20 to the spoke 40 that faces the spoke 20 while passing over the hub 14. The other end of the rib 42 is connected to the inner peripheral surface 12I of the rim 12 at a middle connecting portion 40C of the spoke 40. The rib 54 extends from the spoke 20 to the spoke 50 that faces the spoke 20 while passing over the hub 14. The other end of the rib 54 is connected to the inner peripheral surface 12I of the rim 12 at a middle connecting portion 50C of the spoke 50.

The rib 22 intersects with the rib 42 between the rim 12 and the hub 14 and intersects with the rib 54 above the hub 14. The rib 24 intersects with the rib 54 between the rim 12 and the hub 14 and intersects with the rib 42 above the hub 14. The rib 42 intersects with the rib 54 between the rim 12 and the hub 14.

The structure of each of the spokes 30, 40, 50, and 60 is the same as that of the spoke 20. Note that at every spoke intersection, only two ribs intersect with each other.

Structure of Mandrel of Spoke Unit

Figure 2:
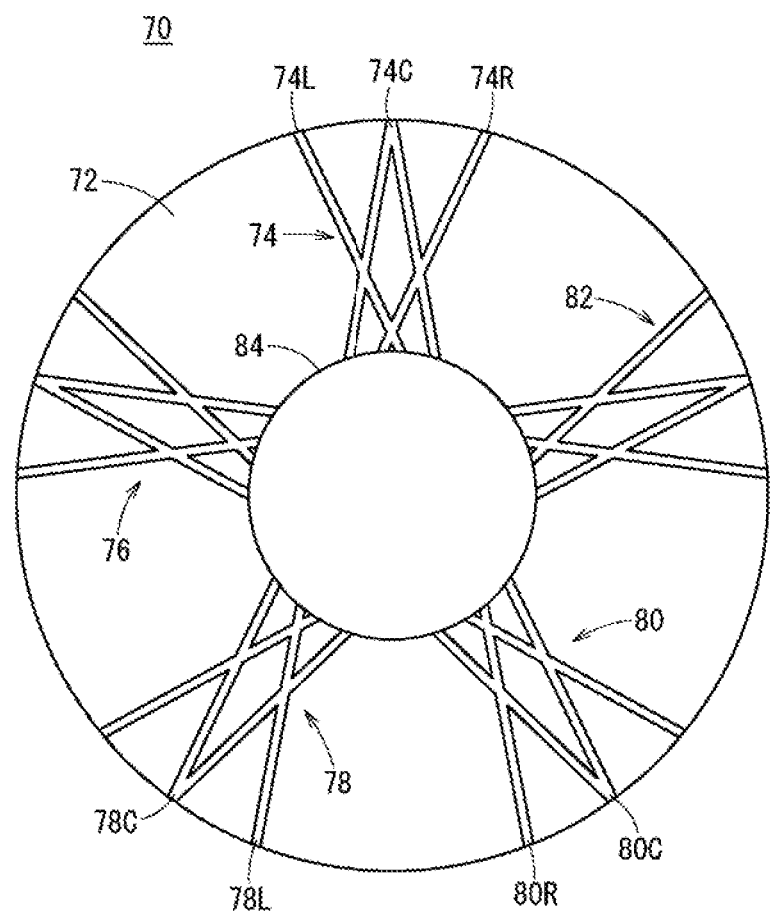
FIG. 2 is a front external view of a mandrel used to mold a spoke unit according to each of the first and second exemplary embodiments.
Figure 4A:
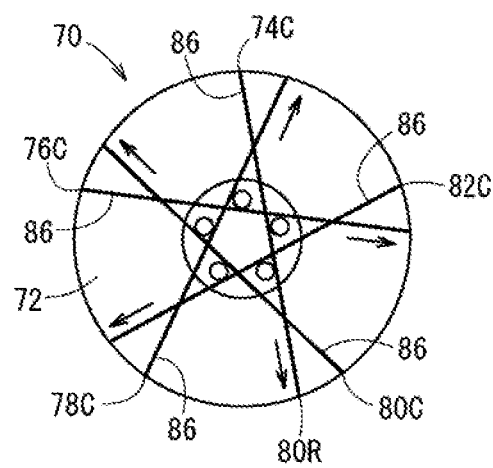
FIGS. 4A to 4D are process transition diagrams illustrating a method for manufacturing a spoke unit according to the first exemplary embodiment.
Figure 4B:
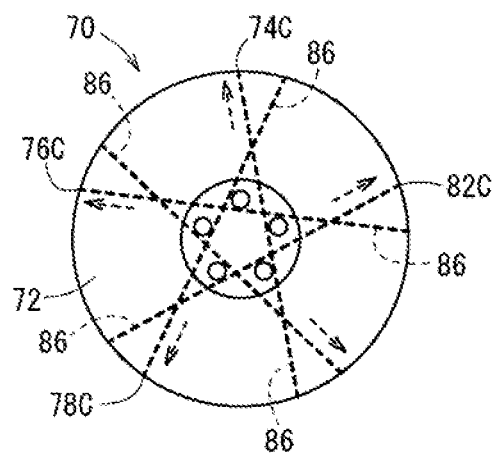
Figure 4C:
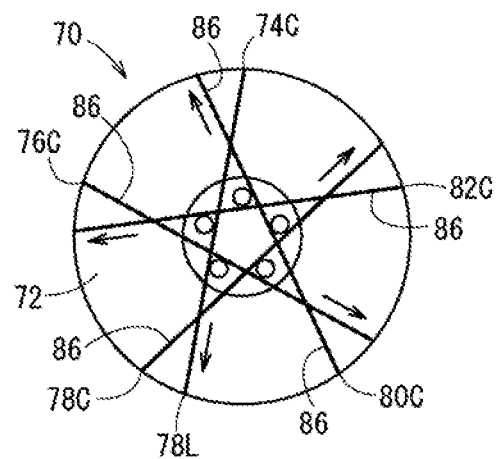
Figure 4D:
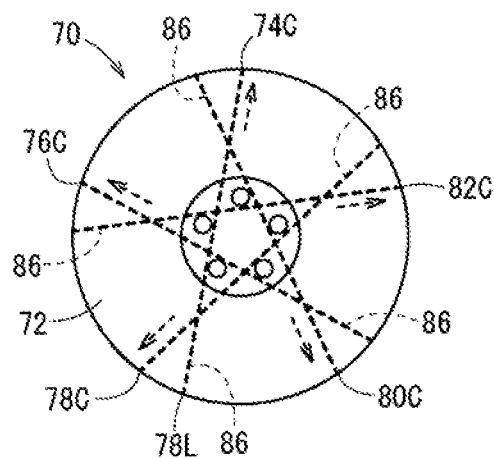

A mold (mandrel) 70 used in the following exemplary embodiment is described below with reference to a front view of the mandrel 70 illustrated in FIG. 2. The mandrel 70 is in the shape of a bowl. For example, the mandrel 70 is formed of a metal or a synthetic resin. A front surface 72 of the mandrel 70 has grooves 74, 76, 78, 80, and 82 having shapes that are the same as the shapes of the spokes 20, 30, 40, 50, and 60, respectively. According to the present exemplary embodiment, the spoke 20 is formed using the groove 74. The groove 74 includes a middle supporting portion 74C corresponding to the middle connecting portion 20C of the spoke 20 (refer to FIG. 1), a first, supporting portion 74R corresponding to the first connecting portion 20R of the spoke 20, and a second supporting portion 74L corresponding to the second connecting portion 20L of the spoke 20. The structure of each of the other grooves 76, 78, 80, and 82 is similar to that of the groove 74. In addition, the front surface 72 has a concave portion 84 at the center thereof. The concave portion 84 is used for mounting the hub 14.

At a position at which any two of the grooves 74, 76, 78, 80, and 82 intersect with each other, the groove has a width that is substantially double the width of each of the grooves 74, 76, 78, 80, and 82. By increasing the width of a groove at the intersecting position, intersecting positions at which the continuous fiber reinforced plastics 86 intersect with each other can be dispersed in the groove. As a result, particularly increased stack thickness of the continuous fiber reinforced plastic 86 at the intersecting positions can be prevented and, thus, difference in height between the intersecting point and the other points is less likely to occur.

Method 1 for Manufacturing Spoke Unit

A method for manufacturing a spoke unit according to the first exemplary embodiment is described below with reference to a process transition diagram illustrated in FIGS. 3A to 3E. In FIGS. 3A to 3E, the procedure for winding a single continuous fiber reinforced plastic 86 around the mandrel 70 having the hub 14 attached to the concave portion 84 (refer to FIG. 2) is described with reference to the front view of the mandrel 70. Note that in FIGS. 3B and 3D, the continuous fiber reinforced plastic 86 wound on the back surface of the mandrel 70 is illustrated as a dotted line.

A first winding process is performed first. As illustrated in FIG. 3A, the continuous fiber reinforced plastic 86 is led from the middle supporting portion 74C corresponding to the middle connecting portion 20C of the spoke 20 (refer to FIG. 1) to a first supporting portion 80R corresponding to the first connecting portion 50R of the spoke 50 (refer to FIG. 1) along the front surface 72 of the mandrel 70. At that time, the continuous fiber reinforced plastic 86 is led along the grooves 74 and 80 formed in the front surface 72.

Subsequently, a second winding process is performed. In this process, as illustrated in FIG. 3B, the continuous fiber reinforced plastic 86 is led from the first supporting portion 80R corresponding to the first connecting portion 50R of the spoke 50 (refer to FIG. 1) to the middle supporting portion 74C corresponding to the middle connecting portion 20C of the spoke 20 (refer to FIG. 1) via the back surface of the mandrel 70.

Subsequently, a third winding process is performed. In this process, as illustrated in FIG. 3C, the continuous fiber reinforced plastic 86 is led from the middle supporting portion 74C corresponding to the middle connecting portion 20C of the spoke 20 (refer to FIG. 1) to a second supporting portion 78L corresponding to the second connecting portion 40L of the spoke 40 (refer to FIG. 1) along the front surface 72 of the mandrel 70. At that time, the continuous fiber reinforced plastic 86 is led along the grooves 74 and 78 formed in the front surface 72.

Subsequently, a fourth winding process is performed. In this process, as illustrated in FIG. 3D, the continuous fiber reinforced plastic 86 is led from the second supporting portion 78L corresponding to the second connecting portion 40L of the spoke 40 (refer to FIG. 1) to the middle supporting portion 74C corresponding to the middle connecting portion 20C of the spoke 20 (refer to FIG. 1) via the back surface of the mandrel 70.

By repeatedly performing the first to fourth processes, a laminate body corresponding to the two ribs 22 and 24 is formed from the continuous fiber reinforced plastic 86, as illustrated in FIG. 3E. By performing the first to fourth processes for each of the five grooves 74, 76, 78, 80, and 82 of the mandrel 70 illustrated in FIG. 2, laminate bodies corresponding to the five spokes 20, 30, 40, 50, and 60 of the spoke unit 16 can be formed.

Thereafter, by performing heat treatment on the laminate bodies of the spoke unit 16 formed in the mandrel 70, each of the continuous fiber reinforced plastics 86 is cured. Thus, the spoke unit 16 is produced.

Note that as illustrated in FIGS. 4A to 4D, the winding processes of the continuous fiber reinforced plastics 86 (the first to fourth winding processes illustrated in FIGS. 3A to 3D) may be simultaneously performed using the five middle supporting portions 74C, 76C, 78C, 80C, and 82C as the starting points of five continuous fiber reinforced plastics 86. According to such a technique, the laminate bodies of the five spokes 20, 30, 40, 50, and 60 can be formed at the same time. Thus, the processes can be efficiently performed. In addition, since five spokes are simultaneously formed, the entire overlap can be made uniform.

According to the first exemplary embodiment, since a turning point of the continuous fiber reinforced plastic 86 is not in the center area of the spoke unit 16, a stack of the continuous fiber reinforced plastic 86 caused by the turn is not generated in the center area of the spoke unit 16. Accordingly, the weight of the center area of the spoke unit 16 can be reduced. In addition, when the plurality of continuous fiber reinforced plastics 86 are wound around the mandrel 70, the intersecting points of the continuous fiber reinforced plastics 86 are shifted from each other. Thus, three or more continuous fiber reinforced plastics 86 do not overlap at the same position. Consequently, the difference in the stack heights of the continuous fiber reinforced plastics 86 can be made uniform, and the shape of the laminate body of the stacked continuous fiber reinforced plastics 86 can be maintained unchanged. As a result, the accuracy of the stacking can be increased.

Second Exemplary Embodiment
Method 2 for Manufacturing Spoke Unit

Figure 5:
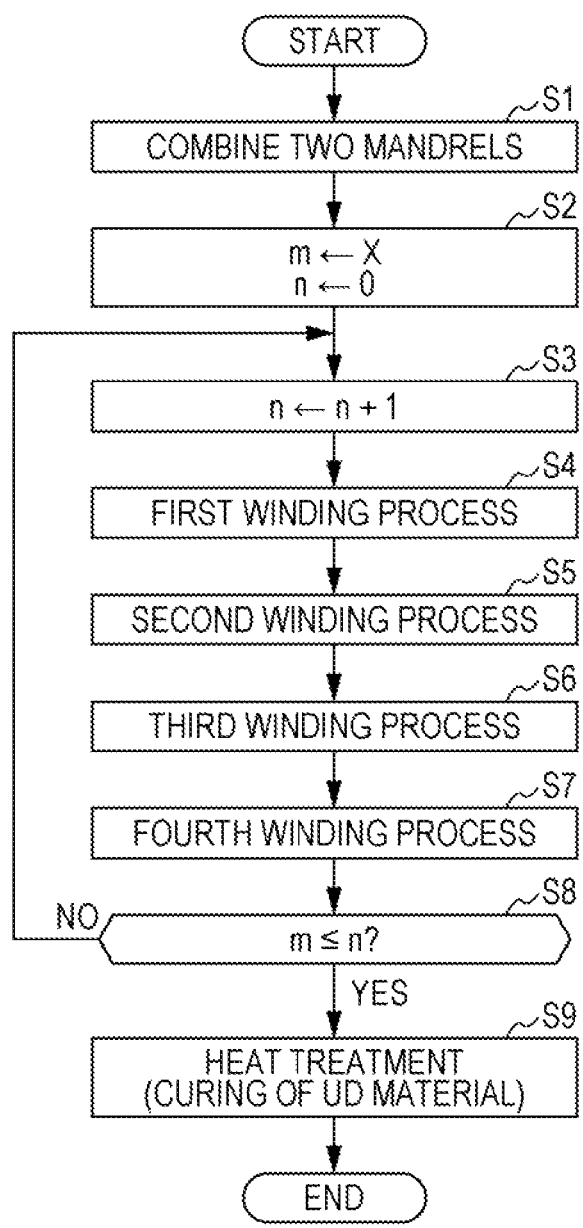
FIG. 5 is a flowchart of the method for manufacturing the spoke unit.

A method for manufacturing a spoke unit according to the second exemplary embodiment is described with reference to a flowchart illustrated in FIG. 5 and process transition diagrams illustrated in FIGS. 6A to 6D, FIGS. 7A to 7D, and FIGS. 8A and 8B. In the above-described first exemplary embodiment, a spoke unit 16 is manufactured using a single mandrel 70. In contrast, according to the second exemplary embodiment, two spoke units 16 are manufactured at the same time using two mandrels 70 (70-1 and 70-2).

Note that according to the second exemplary embodiment, as illustrated in FIGS. 6B to 6D, FIGS. 7A to 7D, and FIGS. 8A and 8B, an annular guiding unit 90 that supplies the continuous fiber reinforced plastic 86 to the two mandrels 70-1 and 70-2 is provided.

The guiding unit 90 includes a continuous fiber reinforced plastic supply portion 92 that supplies the continuous fiber reinforced plastic 86 to the inner peripheral surface of the guiding unit 90. The guiding unit 90 is rotatable about the axis (not illustrated) of the two mandrels 70-1 and 70-2. In addition, the guiding unit 90 is translatable in a direction parallel to the axis. A method for manufacturing a spoke unit is described below with reference to a flowchart illustrated in FIG. 5 and the process transition diagrams illustrated in FIGS. 6A to 6D, FIGS. 7A to 7D, and FIGS. 8A and 8B as needed.

Figure 6A:
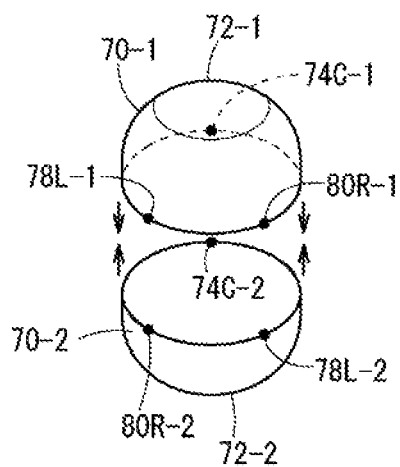
FIGS. 6A to 6D are process transition diagrams illustrating a method for manufacturing a spoke unit according to a second exemplary embodiment.

In step S1, two mandrels 70-1 and 70-2 are combined. At that time, as illustrated in FIG. 6A, the mandrels 70-1 and 70-2 are combined so that the front surface 72-1 of the mandrel 70-1 and the front surface 72-2 of the mandrel 70-2 are oriented in different directions. In this exemplary embodiment, the mandrels 70-1 and 70-2 are combined so that the front surface 72-1 of the mandrel 70-1 and the front surface 72-2 of the mandrel 70-2 are oriented in opposite directions. At that time, a middle supporting portion 74C-1 of the mandrel 70-1 and a middle supporting portion 74C-2 of the mandrel 70-2 are disposed at the same position. Thus, a first supporting portion 80R-1 of the mandrel 70-1 and a second supporting portion 78L-2 of the mandrel 70-2 are located at the same position, and a second supporting portion 78L-1 of the mandrel 70-1 and a first supporting portion 80R-2 of the mandrel 70-2 are located at the same position. Note that a spacer (not illustrated) may be disposed between the two mandrels 70-1 and 70-2.

In step S2, a target number of turns m of the continuous fiber reinforced plastic 86 is set to X (a natural number). In addition, a turn counter n is set to the initial value "0". In step S3, the turn counter n is incremented by one. Thereafter, a first winding process of the continuous fiber reinforced plastic 86 performed in steps S4 to S7 described below starts.

Figure 6B:
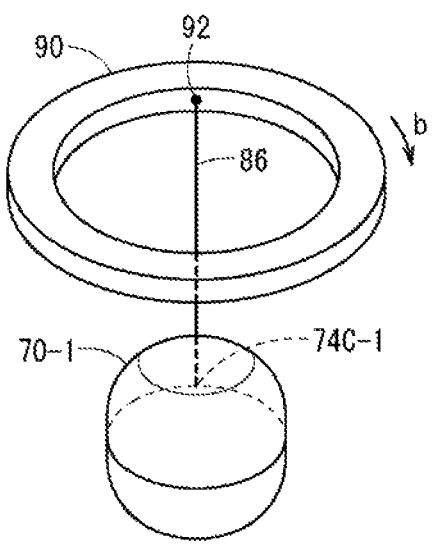
Figure 6C:
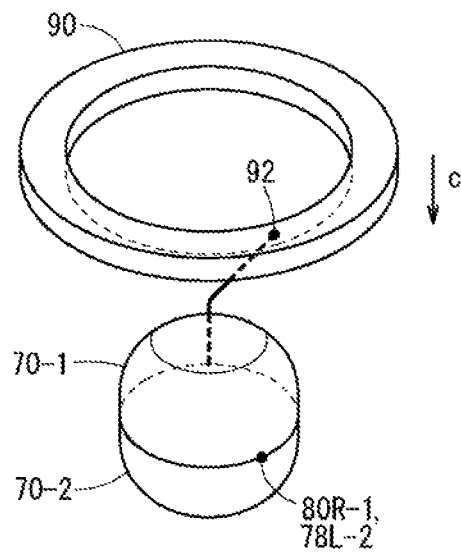
Figure 6D:
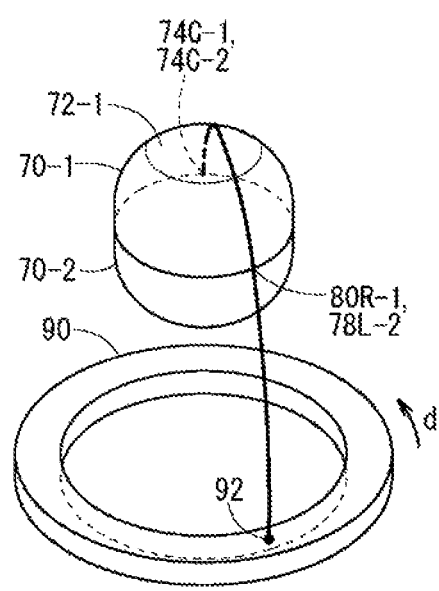

In step S4, a process corresponding to the first winding process illustrated in FIG. 3A is performed. The process is described in more detail below with reference to FIGS. 6B, 6C, and 6D. As illustrated in FIG. 6B, the guiding unit 90 is disposed on a side adjacent to the mandrel 70-1 so as to pass beyond the mandrel 70-1. In addition, the continuous fiber reinforced plastic 86 supplied from a continuous fiber reinforced plastic supply portion 92 is bonded to the middle supporting portion 74C-1 of the mandrel 70-1. Subsequently, the guiding unit 90 is rotated about its axis in a direction of an arrow b. As illustrated in FIG. 6C, the rotation of the guiding unit 90 is stopped at a position at which the continuous fiber reinforced plastic supply portion 92 is the closest to the first supporting portion 80R-1 of the mandrel 70-1 (the second supporting portion 78L-2 of the mandrel 70-2). Subsequently, the guiding unit 90 is translated along the axis in a direction of an arrow c. As illustrated in FIG. 6D, the translation of the guiding unit 90 is stopped at a position on a side adjacent to the mandrel 70-2 at which the guiding unit 90 has passed beyond the mandrel 70-2.

As illustrated in FIG. 6D, by operating the guiding unit 90 in the above-described manner, the continuous fiber reinforced plastic 86 is led from the middle supporting portion 74C-1 corresponding to the middle connecting portion 20C of the spoke 20 (refer to FIG. 1) to the first supporting portion 80R-1 corresponding to the first connecting portion 50R of the spoke 50 (refer to FIG. 1) along the front surface 72-1 of the mandrel 70-1.

In step S5, a process corresponding to the second winding process illustrated in FIG. 3B is performed. The process is described in more detail below with reference to FIG. 6D and FIGS. 7A and 7B. The guiding unit 90 having a state illustrated in FIG. 6D is rotated about its axis in a direction of an arrow d. As illustrated in FIG. 7A, the rotation of the guiding unit 90 is stopped at a position at which the continuous fiber reinforced plastic supply portion 92 is the closest to the middle supporting portion 74C-1 of the mandrel 70-1 (the middle supporting portion 74C-2 of the mandrel 70-2). Subsequently, the guiding unit 90 is translated along the axis in a direction of an arrow e. As illustrated in FIG. 7B, the translation of the guiding unit 90 is stopped at a position on the side adjacent to the mandrel 70-1 at which the guiding unit 90 has passed beyond the mandrel 70-1.

By operating the guiding unit 90 in the above-described manner, the continuous fiber reinforced plastic 86 is led via the back side of the mandrel 70-1. At that time, as illustrated in FIG. 7B, on the front surface 72-2 of the mandrel 70-2, the continuous fiber reinforced plastic 86 is led from the second supporting portion 78L-2 corresponding to the second connecting portion 40L of the spoke 40 (refer to FIG. 1) to the middle supporting portion 74C-2 (the middle supporting portion 74C-1 of the mandrel 70-1) corresponding to the middle connecting portion 20C of the spoke 20 (refer to FIG. 1).

In step S6, a process corresponding to the third winding process illustrated in FIG. 3C is performed. The process is described in more detail below with reference to FIGS. 7B, 7C, and 7D. The guiding unit 90 having a state illustrated in FIG. 7B is rotated about its axis in a direction of an arrow f. As illustrated in FIG. 7C, the rotation of the guiding unit 90 is stopped at a position at which the continuous fiber reinforced plastic supply portion 92 is the closest to the second supporting portion 78L-1 of the mandrel 70-1 (the first supporting portion 80R-2 of the mandrel 70-2). Subsequently, the guiding unit 90 is translated along the axis in a direction of an arrow g. As illustrated in FIG. 7D, the translation of the guiding unit 90 is stopped at a position on the side adjacent to the mandrel 70-2 at which the guiding unit 90 has passed beyond the mandrel 70-2.

As illustrated in FIG. 7D, by operating the guiding unit 90 in the above-described manner, the continuous fiber reinforced plastic 86 is led from the middle supporting portion 74C-1 corresponding to the middle connecting portion 20C of the spoke 20 (refer to FIG. 1) to the second supporting portion 78L-1 corresponding to the second connecting portion 40L of the spoke 40 (refer to FIG. 1) along the front surface 72-1 of the mandrel 70-1.

Figure 8A:
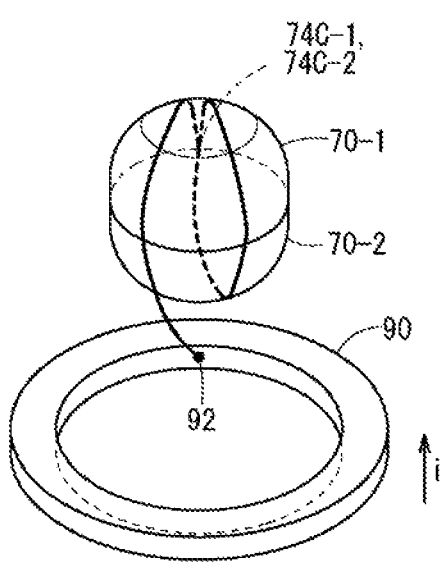
FIGS. 8A and 8B are process transition diagrams illustrating a method for manufacturing a spoke unit according to the second exemplary embodiment.
Figure 8B:
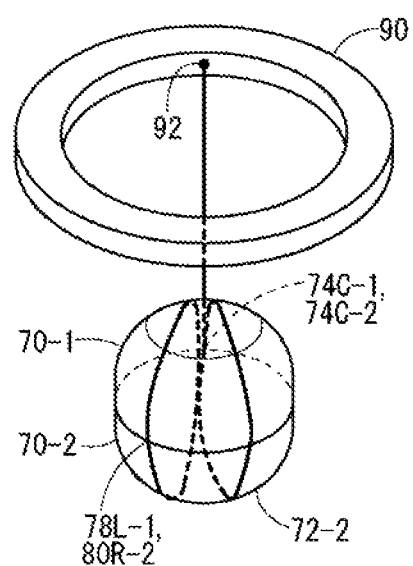

In step S7, a process corresponding to the fourth winding process illustrated in FIG. 3D is performed. The process is described in more detail below with reference to FIG. 7D and FIGS. 8A and 8B. The guiding unit 90 having a state illustrated in FIG. 7D is rotated about its axis in a direction of an arrow h. As illustrated in FIG. 8A, the rotation of the guiding unit 90 is stopped at a position at which the continuous fiber reinforced plastic supply portion 92 is the closest to the middle supporting portion 74C-1 of the mandrel 70-1 (the middle supporting portion 74C-2 of the mandrel 70-2). Subsequently, the guiding unit 90 is translated along the axis in a direction of an arrow i. As illustrated in FIG. 8B, the translation of the guiding unit 90 is stopped at a position on the side adjacent to the mandrel 70-1 at which the guiding unit 90 has passed beyond the mandrel 70-1.

By operating the guiding unit 90 in the above-described manner, the continuous fiber reinforced plastic 86 is led via the back side of the mandrel 70-1. At that time, as illustrated in FIG. 8B, on the front surface 72-2 of the mandrel 70-2, the continuous fiber reinforced plastic 86 is led from the first supporting portion 80R-2 corresponding to the first connecting portion 50R of the spoke 50 (refer to FIG. 1) to the middle supporting portion 74C-2 (the middle supporting portion 74C-1 of the mandrel 70-1) corresponding to the middle connecting portion 20C of the spoke 20 (refer to FIG. 1).

In step S8, the number of turns is counted. If the turn counter n is less than the target number of turns m, the processing proceeds to step S3, and the first to fourth winding processes in steps S4 to S7, respectively, are repeatedly performed. However, if the turn counter n is greater than or equal to the target number of turns m, the winding process of the continuous fiber reinforced plastic 86 is completed. Thereafter, the processing proceeds to step S9.

In step S9, the laminate body of the spoke unit 16 formed in the front surface 72-1 of the mandrel 70-1 and the front surface 72-2 of the mandrel 70-2 is subjected to heat treatment. Thus, the continuous fiber reinforced plastic 86 is cured, and the spoke unit 16 is produced. Thereafter, by separating the mandrel 70-1 from the mandrel 70-2, two spoke units 16 are achieved.

Like the first exemplary embodiment, by using five middle supporting portions 74C, 76C, 78C, 80C, and 82C (refer to FIGS. 4A to 4D) as starting points of five continuous fiber reinforced plastics 86, the winding processes of the five continuous fiber reinforced plastics 86 (steps S4 to S7) can be performed at the same time.

According to the second exemplary embodiment, the effect that is the same as the effect of the first exemplary embodiment can be provided. In addition, according to the second exemplary embodiment, since the mandrel 70-2 is disposed on the back surface side of the mandrel 70-1, two spoke units 16 can be simultaneously produced. That is, the spoke unit 16 can be efficiently formed. Furthermore, the continuous fiber reinforced plastic 86 wound around the back surface side of the mandrel 70-1 can be effectively used.

Third Exemplary Embodiment
Structure of Wheel

Figure 9:
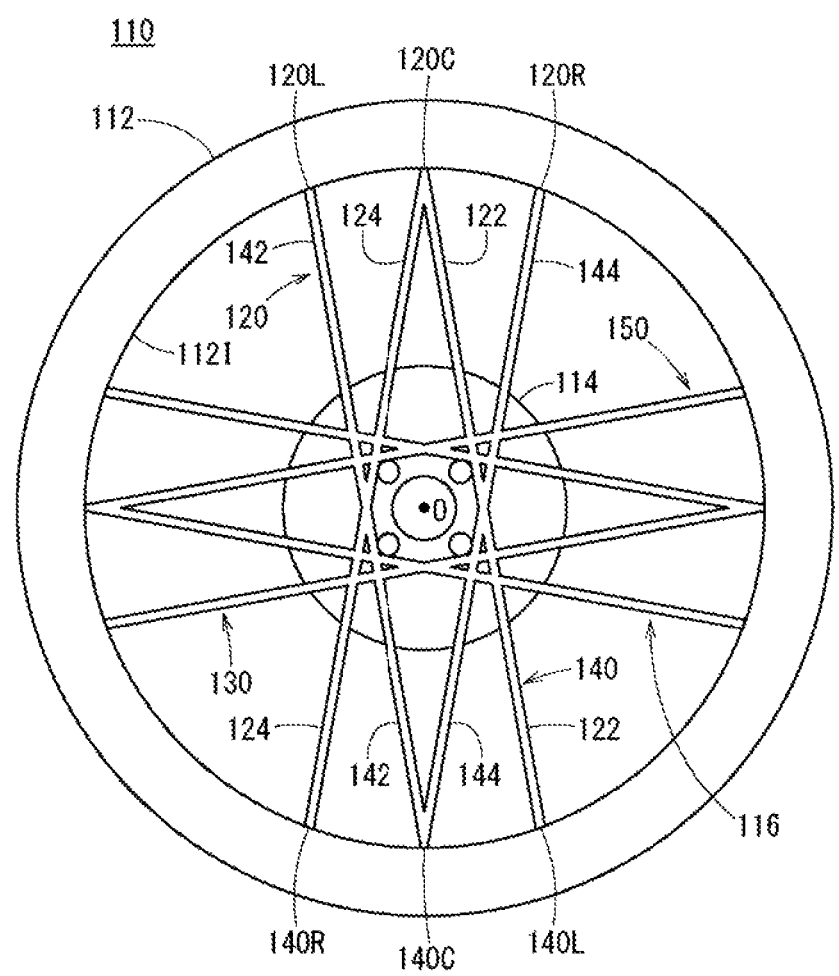
FIG. 9 is a front external view of a wheel according to a third exemplary embodiment.

The structure of a wheel 110 having a spoke unit 116 is described below with reference to the front view of the wheel 110 illustrated in FIG. 9. Since the basic structure of the wheel 110 is the same as that of the wheel 10 illustrated in FIG. 1, description of a constituent element that is the same as that of the wheel 10 is not repeated. The wheel 110 largely differs from the wheel 10 in terms of the number of spokes. The spoke unit 116 of the wheel 110 includes four (2n+2, n: a natural number) integrally molded spokes 120, 130, 140, and 150.

The four spokes 120, 130, 140, and 150 are disposed around a central point O of the spoke unit 116 at equal intervals. For example, the spoke 140 faces the spoke 120 with the central point O of the spoke unit 116 therebetween. Similarly, the spoke 150 faces the spoke 130 with the central point O of the spoke unit 116 therebetween.

The structures of the spokes 120, 130, 140, and 150 are described below with reference to the spoke 120. The spoke 120 has three end portions each connected to an inner peripheral surface 112I of the rim 112. The three end portions are formed from a middle connecting portion 120C, and a first connecting portion 120R and a second connecting portion 120L disposed on either side of the middle connecting portion 120C. That is, the first connecting portion 120R is disposed on the inner peripheral surface 112I on a side of the middle connecting portion 120C in one direction (the clockwise direction in FIG. 9), and the second connecting portion 120L is disposed on the inner peripheral surface 112I on a side of the middle connecting portion 120C in the other direction (the counterclockwise direction in FIG. 9). One end of each of ribs 122 and 124 is connected to the inner peripheral surface 112I of the rim 112 at the middle connecting portion 120C. One end of a rib 144 is connected to the inner peripheral surface 112I of the rim 112 at the first connecting portion 120R. One end of a rib 142 is connected to the inner peripheral surface 112I of the rim 112 at the second connecting portion 120L.

The rib 122 extends from the spoke 120 to the spoke 140 that faces the spoke 120 while passing over the hub 114. The other end of the rib 122 is connected to the inner peripheral surface 112I of the rim 112 at a second connecting portion 140L of the spoke 140. The rib 124 extends from the spoke 120 to the spoke 140 that faces the spoke 120 while passing over the hub 114. The other end of the rib 124 is connected to the inner peripheral surface 112I of the rim 112 at a first connecting portion 140R of the spoke 140.

The rib 144 extends from the spoke 120 to the spoke 140 that faces the spoke 120 while passing over the hub 114. The other end of the rib 144 is connected to the inner peripheral surface 112I of the rim 112 at a middle connecting portion 140C of the spoke 140. The rib 142 extends from the spoke 120 to the spoke 140 that faces the spoke 120 while passing over the hub 114. The other end of the rib 142 is connected to the inner peripheral surface 112I of the rim 112 at the middle connecting portion 140C of the spoke 140.

The rib 122 intersects with the rib 144 above the hub 114. The rib 124 intersects with the rib 142 above the hub 114.

The structure of each of the spokes 130, 140, and 150 is the same as that of the spoke 120. Note that at every spoke intersection, only two ribs intersect with each other.

Structure of Mandrel of Spoke Unit

Figure 10:
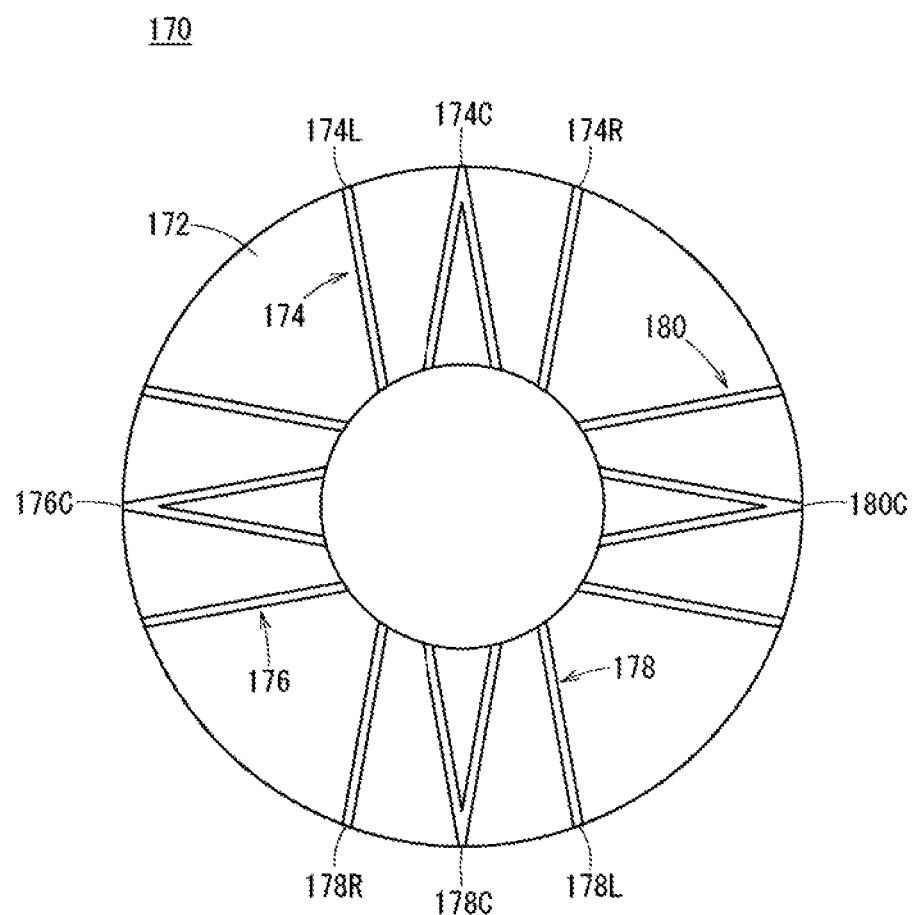
FIG. 10 is a front external view of a mandrel for a spoke unit according to the third exemplary embodiment.

A mandrel 170 used in an exemplary embodiment described below is described with reference to a front view of the mandrel 170 illustrated in FIG. 10. Since the basic structure of the mandrel 170 is the same as that of the mandrel 70 illustrated in FIG. 2, description of a similar constituent element is not repeated. A front surface 172 of the mandrel 170 has grooves 174, 176, 178, and 180 having shapes that are the same as the shapes of the spokes 120, 130, 140, and 150, respectively. According to the present exemplary embodiment, the spoke 120 is formed using the groove 174. The groove 174 includes a middle supporting portion 174C corresponding to the middle connecting portion 120C of the spoke 120 (refer to FIG. 9), a first supporting portion 174R corresponding to the first connecting portion 120R of the spoke 120, and a second supporting portion 174L corresponding to the second connecting portion 120L of the spoke 120. The structure of each of the other grooves 176, 178, and 180 is the same as that of the groove 174.

Method for Manufacturing Spoke Unit

A method for manufacturing a spoke unit according to the third exemplary embodiment is described with reference to a process transition diagram illustrated in FIGS. 11A to 11E. In FIGS. 11A to 11E, the procedure for winding a single continuous fiber reinforced plastic 86 around the mandrel 170 having the hub 114 attached thereto is described with reference to the front view of the mandrel 170. Note that in FIGS. 11B and 11D, the continuous fiber reinforced plastic 86 wound on the back surface of the mandrel 170 is illustrated as a dotted line.

A first winding process is performed first. As illustrated in FIG. 11A, the continuous fiber reinforced plastic 86 is led from the middle supporting portion 174C corresponding to the middle connecting portion 120C of the spoke 120 (refer to FIG. 9) to a second supporting portion 178L corresponding to the second connecting portion 140L of the spoke 140 (refer to FIG. 9) along the front surface 172 of the mandrel 170. At that time, the continuous fiber reinforced plastic 86 is led along the grooves 174 and 178 (refer to FIG. 10) formed in the front surface 172.

Subsequently, a second winding process is performed. In this process, as illustrated in FIG. 11B, the continuous fiber reinforced plastic 86 is led from the second supporting portion 178L corresponding to the second connecting portion 140L of the spoke 140 (refer to FIG. 9) to the middle supporting portion 174C corresponding to the middle connecting portion 120C of the spoke 120 (refer to FIG. 9) via the back surface of the mandrel 170.

Subsequently, a third winding process is performed. In this process, as illustrated in FIG. 11C, the continuous fiber reinforced plastic 86 is led from the middle supporting portion 174C corresponding to the middle connecting portion 120C of the spoke 120 (refer to FIG. 9) to a first supporting portion 178R corresponding to the first connecting portion 140R of the spoke 140 (refer to FIG. 9) along the front surface 172 of the mandrel 170. At that time, the continuous fiber reinforced plastic 86 is led along the grooves 174 and 178 formed in the front surface 172.

Subsequently, a fourth winding process is performed. In this process, as illustrated in FIG. 11D, the continuous fiber reinforced plastic 86 is led from the first supporting portion 178R corresponding to the first connecting portion 140R of the spoke 140 (refer to FIG. 9) to the middle supporting portion 174C corresponding to the middle connecting portion 120C of the spoke 120 (refer to FIG. 9) via the back surface of the mandrel 170.

By repeatedly performing the above-described first to fourth processes, a laminate body corresponding to the ribs 122 and 124 is formed from the single continuous fiber reinforced plastic 86, as illustrated in FIG. 11E. By performing the first to fourth processes for each of the four grooves 174, 176, 178, and 180 of the mandrel 170 illustrated in FIG. 10, laminate bodies corresponding to the four spokes 120, 130, 140, and 150 of the spoke unit 116 can be molded.

Thereafter, by performing heat treatment on the laminate bodies of the spoke unit 116 molded in the mandrel 170, each of the continuous fiber reinforced plastics 86 is cured. Thus, the spoke unit 116 is produced.

Note that the winding processes of the continuous fiber reinforced plastics 86 (the first to fourth winding processes illustrated in FIGS. 11A to 11D) may be simultaneously performed using the four middle supporting portions 174C, 176C, 178C, and 180C as the starting points of four continuous fiber reinforced plastics 86. According to such a technique, the laminate bodies of the four spokes 120, 130, 140, and 150 can be formed at the same time. Thus, the processes can be efficiently performed.

In addition, like the second exemplary embodiment, by combining two mandrels 170, two spoke units 116 can be formed at the same time.

According to the third exemplary embodiment, the effects that are the same as the effects of the first exemplary embodiment and the second exemplary embodiment can be provided.

Other Exemplary Embodiments

It is to be noted that the present disclosure should not be limited to the configurations of the above-described exemplary embodiments. Various types of modifications can be made and such modifications are to be understood as included within the scope of the present disclosure. For example, when manufacturing a spoke unit including 2n+1 or 2n+2 (n: a natural number) spokes other than four or five spokes, the method of the present disclosure can be employed.

In addition, according to the second exemplary embodiment, the mandrel 70 may be rotated and translated instead of rotating and translating the guiding unit 90. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A method for manufacturing a spoke unit having at least three spokes, comprising:
    providing a mandrel for molding a spoke unit, the mandrel including supporting portions equal in number to the number of the spokes;
    winding a continuous fiber reinforced plastic around the mandrel; and
    molding the spoke unit by curing the continuous fiber reinforced plastic,
    wherein the winding includes
    leading the continuous fiber reinforced plastic from the supporting portion corresponding to a first one of the spokes to the supporting portion corresponding to a second one of the spokes along a front surface of the mandrel, the second one of the spokes being disposed opposite to the first one of the spokes, and
    leading the continuous fiber reinforced plastic from the supporting portion corresponding to the second one of the spokes to the supporting portion corresponding to the first one of the spokes along a back surface of the mandrel.

2. The method according to claim 1, wherein the spoke unit includes 2n+1 spokes, where n is a natural number, and each of the spokes is connected to a rim of a wheel at a middle connecting portion, and a first connecting portion and a second connecting portion disposed on either side of the middle connecting portion, each of the spokes including a middle rib connected to and extending from the middle connecting portion, a first rib connected to and extending from the first connecting portion and a second rib connected to and extending from the second connecting portion,
    wherein the mandrel has a middle supporting portion corresponding to the middle connecting portion of the spoke, a first supporting portion corresponding to the first connecting portion of the spoke, and a second supporting portion corresponding to the second connecting portion of the spoke for each of the spokes, and
    wherein when in the spoke unit, any one of the spokes is defined as a first spoke, two spokes each disposed opposite to the first spoke with the center of the spoke unit therebetween are defined as a second spoke and a third spoke respectively, the winding includes:
    a first winding process that leads the continuous fiber reinforced plastic from the middle supporting portion corresponding to the middle connecting portion of the first spoke to the first supporting portion corresponding to the first connecting portion of the third spoke along the front surface of the mandrel,
    a second winding process that leads the continuous fiber reinforced plastic from the first supporting portion corresponding to the first connecting portion of the third spoke to the middle supporting portion corresponding to the middle connecting portion of the first spoke along the back surface of the mandrel,
    a third winding process that leads the continuous fiber reinforced plastic from the middle supporting portion corresponding to the middle connecting portion of the first spoke to the second supporting portion corresponding to the second connecting portion of the second spoke along the front surface of the mandrel, and
    a fourth winding process that leads the continuous fiber reinforced plastic from the second supporting portion corresponding to the second connecting portion of the second spoke to the middle supporting portion corresponding to the middle connecting portion of the first spoke along the back surface of the mandrel.

3. The method according to claim 2, wherein each of the first winding process, the second winding process, the third winding process, and the fourth winding process is performed for all the spokes simultaneously.

4. The method according to claim 2, wherein the middle supporting portion, the first supporting portion and the second supporting portion of the mandrel are disposed at an outer circumference of the mandrel.

5. The method according to claim 1, wherein the spoke unit includes 2n+2 spokes, where n is a natural number, and each of the spokes is connected to a rim of a wheel at a middle connecting portion, and a first connecting portion and a second connecting portion disposed on either side of the middle connecting portion,
    wherein the mandrel has a middle supporting portion corresponding to the middle connecting portion of the spoke, a first supporting portion corresponding to the first connecting portion of the spoke, and a second supporting portion corresponding to the second connecting portion of the spoke for each of the spokes, each of the spokes including a middle rib connected to and extending from the middle connecting portion, a first rib connected to and extending from the first connecting portion and a second rib connected to and extending from the second connecting portion, and wherein when in the spoke unit, any one of the spokes is defined as a first spoke and a spoke disposed opposite to the first spoke with the center of the spoke unit therebetween is defined as a second spoke, the winding includes:

a first winding process that leads the continuous fiber reinforced plastic from the middle supporting portion corresponding to the middle connecting portion of the first spoke to the second supporting portion corresponding to the second connecting portion of the second spoke along the front surface of the mandrel, a second winding process that leads the continuous fiber reinforced plastic from the second supporting portion corresponding to the second connecting portion of the second spoke to the middle supporting portion corresponding to the middle connecting portion of the first spoke along the back surface of the mandrel, a third winding process that leads the continuous fiber reinforced plastic from the middle supporting portion corresponding to the middle connecting portion of the first spoke to the first supporting portion corresponding to the first connecting portion of the second spoke along the front surface of the mandrel, and a fourth winding process that leads the continuous fiber reinforced plastic from the first supporting portion corresponding to the first connecting portion of the second spoke to the middle supporting portion corresponding to the middle connecting portion of the first spoke along the back surface of the mandrel.

6. The method according to claim 5, wherein the middle supporting portion, the first supporting portion and the second supporting portion of the mandrel are disposed at an outer circumference of the mandrel.

7. The method according to claim 1, wherein the mandrel comprises a plurality of grooves disposed on the front surface, and wherein the continuous fiber reinforced plastic is guided by the plurality of grooves.

8. The method according to claim 1, wherein the supporting portions of the mandrel are disposed at an outer circumference of the mandrel.

9. The method according to claim 1, wherein the continuous fiber reinforced plastic includes a continuous filament of fiber reinforced plastic.

10. A method for manufacturing a spoke unit having at least three spokes, comprising:

providing first and second mandrels each for molding a spoke unit, each of the mandrels including supporting portions equal in number to the number of the spokes;

combining the first and second mandrels so that front surfaces of the first and second mandrels are oriented in different directions;

winding a continuous fiber reinforced plastic around the mandrels; and molding the spoke unit by curing the continuous fiber reinforced plastic, wherein the winding includes leading the continuous fiber reinforced plastic from the supporting portion corresponding to a first one of the spokes to the supporting portion corresponding to a second one of the spokes along the front surface of the first mandrel, the second one of the spokes being disposed opposite to the first one of the spokes, and leading the continuous fiber reinforced plastic from the supporting portion corresponding to the second one of the spokes to the supporting portion corresponding to the first one of the spokes along the front surface of the second mandrel, wherein the spoke unit includes 2n+1 spokes, where n is a natural number, and each of the spokes is connected to a rim of a wheel at a middle connecting portion, and a first connecting portion and a second connecting portion disposed on either side of the middle connecting portion, each of the spokes including a middle rib connected to and extending from the middle connecting portion, a first rib connected to and extending from the first connecting portion and a second rib connected to and extending from the second connecting portion, wherein each of the mandrels has a middle supporting portion corresponding to the middle connecting portion of the spoke, a first supporting portion corresponding to the first connecting portion of the spoke, and a second supporting portion corresponding to the second connecting portion of the spoke for each of the spokes, and wherein when in the spoke unit, any one of the spokes is defined as a first spoke, two spokes each disposed opposite to the first spoke with the center of the spoke unit therebetween are defined as a second spoke and a third spoke respectively, the winding includes:

a first winding process that leads the continuous fiber reinforced plastic from the middle supporting portion corresponding to the middle connecting portion of the first spoke to the first supporting portion corresponding to the first connecting portion of the third spoke along the front surface of the first mandrel, a second winding process that leads the continuous fiber reinforced plastic from the first supporting portion corresponding to the first connecting portion of the third spoke to the middle supporting portion corresponding to the middle connecting portion of the first spoke along the front surface of the second mandrel, a third winding process that leads the continuous fiber reinforced plastic from the middle supporting portion corresponding to the middle connecting portion of the first spoke to the second supporting portion corresponding to the second connecting portion of the second spoke along the front surface of the first mandrel, and a fourth winding process that leads the continuous fiber reinforced plastic from the second supporting portion corresponding to the second connecting portion of the second spoke to the middle supporting portion corresponding to the middle connecting portion of the first spoke along the front surface of the second mandrel.

* * * * *